US012650292B2

(12) United States Patent
Wolfgang et al.

(10) Patent No.: US 12,650,292 B2
(45) Date of Patent: Jun. 9, 2026

---

(54) LOW COHERENCE INTERFEROMETRY ON COMPOSITIONS MANUFACTURED USING THERMAL MANUFACTURING PROCESSES

(71) Applicant: Phyllon GmbH, Graz (AT)

(72) Inventors: Matthias Wolfgang, Graz (AT); Johannes Khinast, Graz (AT); Sandra Stranzinger, Graz (AT)

(73) Assignee: PHYLLON GMBH, Graz (AU)

( * ) Notice: Subject to any disclaimer, the term of this patent is extended or adjusted under 35 U.S.C. 154(b) by 275 days.

(21) Appl. No.: 17/904,280

(22) PCT Filed: Oct. 30, 2020

(86) PCT No.: PCT/EP2020/080553
§ 371 (c)(1),
(2) Date: Aug. 15, 2022

(87) PCT Pub. No.: WO2021/164905
PCT Pub. Date: Aug. 26, 2021

(65) Prior Publication Data
US 2023/0082936 A1 Mar. 16, 2023

(30) Foreign Application Priority Data
Feb. 18, 2020 (DE) ..................... 10 2020 104 243.4

(51) Int. Cl.
*G01B 9/0209* (2022.01)
*G01B 9/02091* (2022.01)
(Continued)

(52) U.S. Cl.
CPC ....... *G01B 9/0209* (2013.01); *G01B 9/02091* (2013.01); *G01B 11/0675* (2013.01); *G01N 2021/8411* (2013.01); *G01N 21/8422* (2013.01)

(58) Field of Classification Search
CPC .............. G01B 9/0209; G01B 9/02091; G01B 11/0675; G01N 21/8422; G01N 2021/8411; G01N 21/4795
See application file for complete search history.

(56) References Cited

U.S. PATENT DOCUMENTS 6,868,347 B2 3/2005 Li et al.
8,711,364 B2 4/2014 Brennan et al.
(Continued)

FOREIGN PATENT DOCUMENTS

DE 10 2013 220 601 A1 4/2015
EP 2 310 836 B1 5/2012
(Continued)

OTHER PUBLICATIONS

English translation of DE 102013220601. Obtained from Espacenet on Sep. 14, 2024. (Year: 2024).*
(Continued)

*Primary Examiner* — Michael A Lyons
(74) *Attorney, Agent, or Firm* — Womble Bond Dickinson (US) LLP

(57) ABSTRACT

A method of determining information indicative of a material attribute of a composition, wherein the method comprises manufacturing the composition using a thermal manufacturing process, detecting detection data from the composition by low coherence interferometry during the manufacturing, in particular during said thermal manufacturing process, and determining the information based on the detected detection data.

18 Claims, 4 Drawing Sheets

(51) Int. Cl.
G01B 11/06        (2006.01)
G01N 21/84        (2006.01)

(56)                    References Cited

U.S. PATENT DOCUMENTS

| | | | |
|---|---|---|---|
| 8,768,423 | B2 | 7/2014 | Shakespeare et al. |
| 9,207,190 | B2 | 12/2015 | Steckenrider |
| 2006/0181708 | A1* | 8/2006 | Takahashi .............. G01N 21/45 |
| | | | 356/432 |
| 2014/0106148 | A1 | 4/2014 | Kanzler et al. |
| 2014/0168637 | A1* | 6/2014 | Wan ................... G01B 9/02022 |
| | | | 356/73 |
| 2014/0322429 | A1* | 10/2014 | Markl ................ G01N 21/9508 |
| | | | 118/712 |
| 2016/0228376 | A1* | 8/2016 | Manser ................ A61K 9/5026 |
| 2018/0064817 | A1* | 3/2018 | Patel ...................... A61K 47/12 |
| 2018/0231446 | A1* | 8/2018 | Svanbäck .............. B01F 25/10 |
| 2021/0239450 | A1* | 8/2021 | Hendon ............. G06F 18/2431 |

FOREIGN PATENT DOCUMENTS

| | | | |
|---|---|---|---|
| EP | | 2 799 842 B1 | 12/2019 |
| WO | WO 2010/089793 | A2 | 8/2010 |

OTHER PUBLICATIONS

Corresponding International Search Report and Written Opinion of PCT/EP2020/080553, Jan. 21, 2021, 16 pages.

Corresponding German Search Report of 10 2020 104 243.4, Oct. 29, 2020, 7 pages.

Hierzenberger, et al, "In-Situ Optical Coherence Tomography (OCT) for the Time-Resolved Investigation of Crystallization Processes in Polymers", Macromolecules, vol. 47, No. 6, Mar. 14, 2014, p. 2072-2079, XP055764281.

Das Neves, et al., "Vaginal Drug Delivery", Pharmaceutical Science Encyclopedia, 2010, p. 1-68, XP055764655.

Markl, et al, "Supervisory Control System for Monitoring a Pharmaceutical Hot Melt Extrusion Process", AAPS Pharmscitech, vol. 14, No. 3, Jun. 26, 2013, p. 1034-1044, XP055139284.

Markl et al., "Calibration-free in-line monitoring of pellet coating processes via optical coherence tomography", Chemical Engineering Science, vol. 125, 2015, p. 200-208.

Markl et al., "In-Line Monitoring of a Pharmaceutical Pan Coating Process by Optical Coherence Tomography", Journal of Pharmaceutical Sciences, vol. 104, 2015, p. 2531-2540.

Markl et al., "Automated pharmaceutical tablet coating layer evaluation of optical coherence tomography images", Meas. Sci. Technol., No. 26, 035701, 2015, 13 pp.

Markl Daniel et al, Calibration-free in-line monitoring of pellet coating processes via optical coherence tomography, Chemical Engineering Science, Oxford, GB, vol. 125, Jun. 3, 2014 (Jun. 3, 2014), 9 pages.

European Office action Application No. 20 800 848.2, dated Oct. 17, 2024, 5 pages.

* cited by examiner

LOW COHERENCE INTERFEROMETRY ON COMPOSITIONS MANUFACTURED USING THERMAL MANUFACTURING PROCESSES

CROSS-REFERENCE TO RELATED APPLICATIONS

This application is a U.S. National Phase Patent Application of International Patent Application Number PCT/EP2020/080553, filed on Oct. 30, 2020, which claims priority to German Patent Application Number 10 2020 104 243.4, filed on Feb. 18, 2020, the entire content of each of which is incorporated by reference herein.

FIELD OF THE INVENTION

The invention relates to a method of and an apparatus for determining information indicative of a material attribute of a composition.

TECHNOLOGICAL BACKGROUND

Solid dosage forms such as tablets, pellets, capsules and the like are covered by a coating if required. The reasons why solid dosage forms may be covered by a coating are manifold. For instance, a coating may permit to provide a solid dosage form which is resistant to gastric juice. Further, a coating may provide the possibility to modify a release of an ingredient comprised in the solid dosage form. For example, the release of the ingredient comprised in the solid dosage form may be retarded or delayed with respect to an uncoated solid dosage form. Additionally, a coating may prevent that the solid dosage form is damaged. Also, a coating may reduce or even prevent that an ingredient or a substance of a solid dosage form undergoes a chemical reaction, for example, due to contact with air, humidity or a chemical substance. Moreover, some ingredients of a solid dosage form may have a displeasing taste which may be masked by a coating. Further, coatings may also be used in order to maintain an expiration date of a solid dosage form. In order to fulfill these requirements, the coating needs to be applied with a certain thickness, homogeneity and/or quality. For example, if a coating layer is not thick enough, the coating may crack upon contact with another solid dosage form or a container or the solid dosage form may not be resistant to gastric juice to properly control a diffusion of an active pharmaceutical ingredient (API).

In order to determine a thickness of a coating, the thickness of the coating may be measured after the coating process is finished, for example by weighing the solid dosage form before and after the coating is formed on the solid dosage form and determining the percentage of the weight gain. Alternatively, the thickness of a coating on a solid dosage form may be determined with a spectroscopy method, for example near infrared or Raman spectroscopy. Although near infrared or Raman spectroscopy may be applied during a coating process, these methods need a reference model (such as a chemometric or a dynamic model) which allows to connect a measured spectrum to a corresponding coating thickness. For example, a coating thickness corresponding to a certain spectrum may be determined using a scanning electron microscope which, however, may destroy the coating and/or the solid dosage form, particularly chemical compounds in the coating and/or the solid dosage form. Further methods for determining a thickness of a coating may be terahertz pulse imaging, magnetic resonance imaging (MRI), X-ray microcomputed tomography (XμCT), and the formation of cross sectional cuts with light microscopy. In particular, the methods know in the prior art may not allow to determine other properties of the coating than the thickness of the coating without destruction or modification of the sample and/or in a reasonably short time. Further, the known methods may be too slow and/or not precise enough to be applied during a process forming the coating.

EP 2,799,842 discloses a method and a device for monitoring a property of a coating of a solid dosage form during a coating process forming the coating of the solid dosage form. The device comprises a coating apparatus configured for forming the coating on the solid dosage form, and a monitoring apparatus configured for monitoring the property of the coating of the solid dosage form in process, wherein at least a part of the monitoring apparatus is located so as to have insight in an interior of the coating apparatus, the interior accommodating the solid dosage form to be coated and a precursor for forming the coating, and wherein the monitoring apparatus is configured for monitoring the property of the coating of the solid dosage form simultaneously with and during a coating process using low coherence interferometry.

EP 2,799,842 discloses said method in connection with a drum coater.

SUMMARY OF THE INVENTION

There may be a need to flexibly determine a property of a composition quickly and accurately.

According to an exemplary embodiment of the invention, a method of determining information indicative of a material attribute of a (for instance at least partially solid) composition (for example a dosage form and/or a pharmaceutical composition) is provided, wherein the method comprises manufacturing the composition using a thermal manufacturing process, detecting detection data from the composition by low coherence interferometry during the manufacturing (in particular during said thermal manufacturing process), and determining the information based on the detected detection data.

According to another exemplary embodiment of the invention, an apparatus for manufacturing a (for instance at least partially solid) composition and for determining information indicative of a material attribute of the manufactured composition is provided, wherein the apparatus comprises a manufacturing device configured for manufacturing the composition using a thermal manufacturing process, a detection probe configured for detecting detection data from the composition during manufacture (in particular during said thermal manufacturing process) by low coherence interferometry, and a processor configured for determining the information based on the detected detection data.

The term "composition" may particularly denote a body made of multiple constituents which made be formed by a thermal manufacturing process. In particular, a composition may be a dosage form which is adapted to be administered to a human or an animal. For example, the composition may be a tablet having a solid outer shell and a liquid core. In particular, the composition may be at least partially solid. For instance, the at least partially solid composition may be entirely solid. In particular, the composition may be a tablet, a pellet, a bead, a pill, a capsule, a suppository, a strand, a patch, a film such as an ODF (oral dispersible film), a film foil, a ring and all other compositions. Further, the composition may be a pharmaceutical composition, and it may comprise an active drug component such as an active pharmaceutical ingredient and/or a nondrug component. The nondrug component may for example be an excipient. Thus, the composition may be configured for a pharmaceutical application. However, exemplary embodiments of the invention are not limited to pharmaceutical applications. For example, the composition may be a pharmaceutical drug, a dietary supplement, and/or a food product. Hence, exemplary embodiments may also be applied to food or feed products.

The term "low coherence interferometry" or "LCI" may particularly denote an interferometry method which exploits the special properties of light having a low coherence. Examples for low coherence interferometry may be white light interferometry (WLI) and optical coherence tomography (OCT). Typically, a light source with high spatial and low temporal coherence may be employed. Particular examples for suitable light sources may include, among others, superluminescence diodes, femtosecond lasers or tunable laser sources, and supercontinuum lasers. In special applications also tunable laser sources may be applied.

The term "material attribute" may particularly denote one or more physical, chemical, biological, pharmaceutical, structural and/or functional property of a composition. For instance, a material attribute may be a property of a coating layer, for instance its thickness or thickness distribution. Another material attribute which may be determined is a characterization of crystallites or crystalline sections in a composition. For instance, such crystalline sections may be formed by precipitation in a core of a composition and may be identified and characterized by OCT. In particular, such a material attribute may be correlated with an intended (in particular physiological) function of the composition. For example, a material attribute may be described by one or more parameters.

The term "thermal manufacturing process" may particularly denote a manufacturing process or part thereof, which uses elevated temperature (in particular at least 50° C., more particularly at least 100° C.) for creating compositions. More specifically, the composition, a part thereof and/or a precursor thereof may be heated to said elevated temperature (in particular to at least 50° C., more particularly to at least 100° C.) during manufacture of the composition. Thermal manufacturing may thus rely on heat-driven processes like drying (in particular removal of water that is not chemically bound to a material), smelting, heat treating (in particular the application of thermal energy to change the phase, in particular the microstructure, of a material), curing (in particular crosslinking of polymer chains in polymer-based materials of the composition), extruding (in particular a manufacturing process in which raw plastic or polymer, or another appropriate material is melted and formed into a continuous profile) and molding (in particular manufacturing by shaping liquid or pliable raw material using a rigid frame tool, which may be denoted as a mold or matrix, for solidifying at least part of the composition), etc., to produce at least partially solid compositions or preforms (for instance an endless strand to be separated into individual compositions embodied as dosage forms) thereof. In particular, such an elevated temperature may directly influence at least one property of the composition.

The term "determining the information based on the detected detection data" may particularly denote a process of evaluating captured detection data, more specifically light interference detection data, captured by an LCI probe from the composition during the manufacturing process. In this context, the concept of LCI may be applied so as to derive one or more material attributes, such as layer thickness, of the manufactured composition(s).

According to an exemplary embodiment of the invention, low coherence interferometry may be used for monitoring a thermal manufacturing process carried out for producing compositions, and for monitoring correspondingly manufactured products in form of said compositions. Said monitoring may be carried out on the fly, i.e. during or simultaneously with the manufacturing process and preferably during or simultaneously with the thermal manufacturing process. For instance, pharmaceutical compositions such as coated cores having a pharmaceutically active agent may be monitored during their thermal manufacturing process. It has been surprisingly found that the contactless method of LCI is particularly appropriate for continuously monitoring the thermal manufacturing process of producing compositions, since it does not require any physical contact for determining the material attribute information. More specifically, it has turned out that LCI may be advantageously applied to determine material attribute properties of compositions with constituents which are presently undergoing or have just undergone a phase transition from a flowable phase to a solid phase. Thus, a user may flexibly apply LCI for analyzing compositions produced by a thermal manufacturing process in a reproducible, reliable and precise way. Since LCI applied to compositions produced using one or more thermal manufacturing processes is very quick and nevertheless accurate, it has turned out possible to monitor in-line, i.e. in parallel to the manufacturing process, by LCI. Thus, LCI may be applied in particular advantageously in a manufacturing process carried out on an industrial scale and involving thermal manufacturing for monitoring the manufacturing process by preferably continuously determining the material attribute (for instance thickness information concerning a coating) of the manufactured compositions.

DETAILED DESCRIPTION OF EXEMPLARY EMBODIMENTS

In the following, further exemplary embodiments of the method and the apparatus will be explained.

In an embodiment, the composition is a pharmaceutical composition. The capability of LCI to quickly and accurately as well as reproducibly determine a material attribute, such as a coating thickness of the composition, renders LCI particularly appropriate for pharmaceutical applications in which pharmaceutical compositions are produced by executing a thermal manufacturing process such as extrusion. In particular, exemplary fields of application of exemplary embodiments of the invention are the field of medicine, pharmaceutical engineering, supplements, contraception, etc. In other words, the composition may relate in particular to one or more of the pharmaceutical products of the aforementioned lists.

In an embodiment, the method comprises determining the information during the manufacturing, in particular during the thermal manufacturing process. Thus, the material attribute may be monitored in an in-line process, i.e. while the compositions are produced by thermal manufacturing. This has the advantage that, when the analysis of the material property indicates anomalies or deviations from a predefined specification, the thermal manufacturing process—or more generally the entire manufacturing process—may be adapted, for instance essentially in real time, to continue the production of compositions in compliance with a predefined specification. Hence, the determination of the material attribute simultaneously with the manufacturing process with high precision and the opportunity to react on determined issues is of utmost advantage for industrial manufacturing processes with high throughput.

In an embodiment, the method comprises manufacturing the composition by a thermal manufacturing process involving a phase transition of material of the composition. Said a phase transition may be a (in particular thermally triggered) phase transition between a solid phase and a liquid phase or a viscous phase. Such a phase transition may be a transition of material of the composition from a flowable phase (for instance a high viscous or even liquid phase) to a solid phase, i.e. a phase assumed after having solidified a previous melted or flowable precursor material of the compositions during the thermal manufacturing process. Highly advantageously, low coherence interferometry has turned out as suitable for being implemented before, during or directly after such a phase transition.

In an embodiment, the method comprises manufacturing the composition by a thermal manufacturing process which comprises at least one of the group consisting of extrusion (in particular co-extrusion) and molding (in particular injection molding).

Extrusion may denote a process which starts by feeding (in particular plastic or polymer) material (such as pellets, granules, flakes or powders) from a hopper into a barrel of the extruder. For example, the thermal manufacturing process may be an extrusion process during which a precursor for extruded compositions is melted so as to render it flowable during the extrusion process. After extruding, the extruded composition may then be made partially or entirely solid by reducing the temperature until solidification. The material may be gradually melted by the mechanical energy generated by turning screws and by heaters arranged along the barrel. The molten polymer may then be forced into a die, which shapes the polymer into a shape that hardens during cooling. The LCI measurement may be carried out at an outlet of the die at which the shaped compositions or a preform thereof (for instance an endless strand) leave(s) the thermal manufacturing device in form of the extruder.

Co-extrusion may denote an extrusion of multiple layers of material simultaneously. This type of extrusion may utilize two or more extruders to melt and deliver a steady volumetric throughput of different viscous plastics to a single extrusion head (which may be denoted as a die) which may extrude the mufti-material compositions in the desired form. Layer thicknesses of layers formed by co-extrusion may be controlled by relative speeds and sizes of the individual extruders delivering the materials. The LCI measurement may be carried out at an outlet of the co-extruder at which the shaped compositions or a preform thereof (for instance an endless strand) leave(s) the thermal manufacturing device in form of the co-extruder.

Preferably, the monitored thermal manufacturing process of producing the compositions is extrusion. By extrusion, precursors of the produced compositions may be made flowable or even liquid so as to be able to bring the material into a desired shape in accordance with an intended function of the manufactured compositions. Such an extrusion process may be highly suitable for producing the compositions on an industrial scale while LCI may continuously monitor one or more material attributes of the manufactured compositions. In particular in the pharmaceutical field, the manufacture of compositions with a core and a coating covering the core is of high importance. It has been surprisingly found that co-extrusion is highly appropriate for manufacturing such kind of compositions. Descriptively speaking, a composition's core may be produced as a piece of a continuous strand which may be formed by a first extrusion process. A surrounding shell of the composition may be manufactured by a second extrusion process, so as to surround the core in form of a shell or coating. In particular, monitoring of the thickness or thickness distribution, as examples for material attributes, of the coating may be carried out with low coherence interferometry.

However, other thermal manufacturing processes may be monitored by LCI as well for determining material attributes of compositions. In particular, a molding process may be another example for such a thermal manufacturing process which is properly compatible with LCI. As already mentioned above, molding may denote the process of manufacturing by shaping liquid or pliable raw material using a rigid frame tool which may be denoted as a mold or matrix.

More specifically, injection molding may denote a manufacturing process for producing parts by injecting molten material into a mold. Injection molding can be performed with different kinds of materials, in particular thermoplastic and thermosetting polymers. Raw material for the compositions to be produced may be fed into a heated barrel, mixed (for instance using a helical shaped screw), and injected into a mold cavity, where it cools and hardens to the configuration of the cavity. For analyzing the for instance solid compositions or a preform thereof during a molding-based manufacturing method, an LCI probe may be arranged in particular with its field of view extending into the cavity. Alternatively, the LCI probe may analyze the compositions directly after removing the produced solid compositions from the mold tool.

During molding, in particular injection molding, a precursor of the compositions may be supplied in a melted, liquid, viscous or flowable form before being cured and solidified to form the readily manufactured compositions. Also in terms of such a molding process, low coherence interferometry may be implemented advantageously for continuously monitoring material attributes.

In an embodiment, the method comprises manufacturing the composition by coating a core, in particular by forming a plurality of coatings or coating layers on a core. The term "coating" may particularly denote a covering that is applied to the surface of an object, for example a core of a composition. In particular, a coating may comprise one or more layers. Moreover, a coating may also include an active pharmaceutical ingredient. A coating may improve surface properties of the composition, such as appearance, adhesion, wettability, corrosion resistance, wear resistance, scratch resistance, roughness, and storage life. Further, a coating may reduce or prevent a chemical reaction of a substance in the composition. In particular, a coating may also improve a resistance of a composition against gastric juice, or may function as a barrier against moisture. Further, a coating may provide the possibility to modify a release characteristic of an ingredient comprised in the composition. Additionally, a coating may be used to mask a displeasing taste of a composition, particularly a taste of an ingredient of the composition. A coating may also function as a membrane and/or as a light protection. Thus, coating a core has many applications for compositions, in particular in the pharmaceutical field.

In an embodiment, the method comprises bringing the composition in a field of view of a detection probe which detects the detection data during manufacturing the composition. For example, an LCI probe (preferably an OCT probe) may be arranged or mounted so as to view into one or more optically transparent windows of a manufacturing chamber (for instance an extruder or a mold tool) so that LCI (preferably OCT) data may be acquired during the thermal manufacture of the compositions. This may allow for a real-time inline monitoring of the thermal manufacturing (preferably thermal coating) process. In the described embodiment, a processing of the detection data may be carried out preferably in real-time or in-line with the manufacturing process to thereby allow for a continuous monitoring of the manufacturing process by LCI. LCI is a powerful analysis tool for determining material attributes in form of a property of the coating integrated in the thermal manufacturing process.

In other embodiments, the method may be carried out at-line or on-line or off-line. On-line and in-line analyses differ essentially from off-line and at-line methods in that the time in which information about process or material properties is obtained is shorter than the time in which these properties change. This means that on-line and in-line analyses permit continuous process control. Off-line and at-line analyses, on the other hand, are characterized by manual sampling followed by discontinuous sample preparation, measurement and evaluation.

In an embodiment, the method comprises manufacturing the composition by extruding a core and, in particular simultaneously or subsequently, coating the core. For instance, the core of compositions may be formed by an extrusion process, during which a strand of infinity length may be formed. Such a strand may then be separated into multiple pieces corresponding to individual compositions, for instance by cutting. A highly efficient manufacture of compositions may be obtained when such an extruded core in form of a strand is thereafter coated so as to form a coating on the core. The coating may be used for fine-tuning the properties of the compositions.

In an embodiment, the method comprises coating the (in particular extruded) core by one of the group consisting of carrying out a further extrusion, and an immersing in a coating bath, in particular a cooling bath. Thus, co-extrusion or coating by immersion may be used for forming the coating of the extruded core. However, other methods of forming such a coating, such as spraying, dispensing or printing may be implemented as well. All of these methods of forming a coating are compatible with the concept of monitoring one or more material attributes thereof during the manufacturing process.

In an embodiment, the method comprises determining information indicative of a material attribute of a polymeric structure of the composition, Polymers may be denoted as chemicals being provided as a long sequence of corresponding monomers. Since polymeric structures are particularly suitable for thermal manufacturing processes, such as extrusion or molding, polymer material is a particular suitable choice for at least part of the material of the manufactured compositions. Thermally triggered polymerization, polycondensation and/or polyaddition may be implemented for curing such a polymer material.

In an embodiment, the method comprises determining the information indicative of the material attribute of the composition without destruction of the composition. Highly advantageously, LCI is a completely non-invasive and contact free method capable of monitoring the one or more material attributes or properties of the manufactured compositions during the manufacturing process, even when a solidification process has not yet been completed. Thus, the compositions are neither physically manipulated, nor destructed, nor destroyed during the monitoring process. This is of utmost advantage in particular in the field of pharmaceutical compositions, since this may allow to achieve a high reproducibility of the analysis of compositions during manufacture with precisely defined properties.

In an embodiment, the method comprises continuously determining the information indicative of the material attribute of compositions being continuously manufactured during the detecting. Such a continuous monitoring of material attributes of compositions during the thermal manufacturing process may allow to continuously monitor said process and to directly react on potential issues during the thermal manufacturing. For instance, a process control unit may be configured for adapting or changing the parameters of the thermal manufacturing process when undesired material properties are found in the manufactured compositions.

In an embodiment, the method comprises determining the information indicative of the material attribute of the composition around more than half (i.e. more than 180°) of a circumference of the composition, preferably along an entire circumference of the respective composition. For example, an endless strand can be created as a preform of compositions during a thermal manufacturing process such as an extrusion. Monitoring the properties not only at one side position of the coating, but preferably around more than half of the circumference and preferably around the entire circumference is particularly appropriate in order to obtain meaningful information concerning the material property. For instance referring to the example of pharmaceutical compositions, a continuous thickness of a coating of a core may be of utmost importance, since otherwise the pharmaceutical function of the compositions may not be ensured. Thus, homogeneity of the thickness of such a coating may be analyzed advantageously around the entire perimeter of the composition or a preform thereof.

In an embodiment, the method comprises continuously detecting detection data and continuously determining the information of an endless strand constituting one or more compositions (or part thereof and/or a preform thereof) and being formed continuously by the thermal manufacturing process, in particular extrusion, more particularly co-extrusion. Manufacture of such an endless strand as preform for the compositions is very efficient and can be monitored continuously by LCI according to an exemplary embodiment of the invention. Thus, efficiency of the manufacturing process and reliability and accuracy of the monitoring of the material attributes may be combined.

In an embodiment, the method comprises determining the information by carrying out image recognition, in particular automated image recognition. For instance, for the example of an extrudate or a co-extrudate, compositions with predefined geometry may be expected. Thus, the expected geometry may be used for an image recognition algorithm so as to quickly and precisely determine the material attribute. For instance, the material attribute may be the thickness or thickness distribution of a coating on a circular core of the compositions. Such a concept enables a quick determination of the material attribute during the manufacturing process.

In an embodiment, the method comprises determining information indicative of a quality of the composition based on the determined information indicative of the material attribute of the composition. In particular, one or more quality criteria may be determined by a data evaluation algorithm, which can be applied for further processing the determined material attribute. For example, such a quality criterion may be that the thickness of a coating is within a predefined range. Another quality criterion may be that a deviation from an average thickness of a coating along a circumference of the composition is lower than a predefined threshold value. By applying such one or more quality criteria to the previously determined material attribute parameter(s), a meaningful evaluation of the thermal manufacturing process and the manufactured compositions can be accomplished. The determined quality information may be taken as a basis for classifying the manufactured compositions (for instance classifying them into "pass" or "fail") and/or as a basis for a possible adaptation of the manufacturing process in view of determined discrepancies between the actual quality compared with a target quality as defined by a specification.

In an embodiment, the method comprises manufacturing a composition which is configured as an intravaginal ring for contraception. Such an intravaginal ring for contraception may be structurally composed of a core having a pharmaceutically active agent surrounded by a coating. The coating may ensure delayed and controlled release of the pharmaceutically active agent. Consequently, a correct and homogenous thickness of the coating is important to reliably provide the function of contraception. This can be ensured by the monitoring process according to an exemplary embodiment of the invention, since such an intravaginal ring may be formed advantageously by co-extrusion.

In an embodiment, the method comprises detecting the detection data by optical coherence tomography (OCT). In particular, optical coherence tomography may refer to a two or three dimensional imaging technique, while low coherence light interferometry and white light interferometry may refer to a one dimensional imaging technique. The optical setup for low coherence interferometry such as white light interferometry or OCT may typically comprise an interferometer, for example a Michelson type interferometer. However, also other types of interferometers, such as a Mach-Zehnder interferometer or a Sagnac interferometer, may be employed. More particularly, the light of the light source may be split into a reference and a sample arm and recombined after the light beam in the sample arm has been modified by the sample. The light of the reference arm and the sample arm may interfere with one another when the light beams are recombined. The recombined light may be used to analyze a property of the sample.

In an embodiment, the method comprises determining information indicative of at least one material attribute of a group consisting of a thickness of a coating of the composition, a thickness distribution of a coating of the composition, a roughness of an exterior surface of the composition, a roughness between a core and a coating of the composition, a refraction index of at least part of the composition, information concerning an inclusion of the composition, information concerning a porosity of the composition, information concerning homogeneity of the composition, and information concerning a scattering behaviour of the composition. However, other material attributes may also be determined according to exemplary embodiments, additionally or alternatively to one or more of the mentioned examples.

In an embodiment, the apparatus comprises at least one further detection probe, wherein the detection probes (i.e. the aforementioned detection probe and the at least one further detection probe) are arranged at different angular positions around a circumference of the manufactured composition. Highly advantageously, the provision of multiple (for instance stationary and/or movable) LCI probes surrounding the circumference of a composition or a preform thereof (for instance an extruded strand) may allow to continuously monitor the material property along the entire circumference of the compositions. For example, this may enable the determination of a thickness distribution of a coating on a core along the entire perimeter.

In an embodiment, the detection probe and the at least one further detection probe are stationary, i.e. spatially fixed. Stationary LCI detection probes may be advantageous, since this reduces the number of movable parts of the apparatus. This has also a positive impact on the accuracy of the determination of the material attribute, since no motion-based artifacts need to be considered.

In an embodiment, the apparatus comprises a motion mechanism configured for moving the detection probe and the manufactured composition relative to each other (for instance, also probe as well as composition (for example strand) can be moved). The advantage of the provision of a motion mechanism for establishing a mutual motion between manufactured composition or a preform thereof (for instance an endless extruded strand) and one or more probes has the advantage that this allows to determine the material property along the entire perimeter while keeping the number of implemented detection probes very small (in particular a single detection probe may then be sufficient which may be provided to rotate around the composition, or vice versa).

In one embodiment, the motion mechanism is configured for moving, in particular rotating, the composition while the detection probe is stationary, i.e. spatially fixed. In another embodiment, the motion mechanism is configured for moving, in particular rotating, the detection probe while the composition is stationary. Thus, in one alternative, the composition (or a preform thereof, such as an extruded strand) may remain stationary while the detection probe rotates around it. In another embodiment, the detection probe may be kept stationary and a composition or a preform strand may rotate. It has turned out that the latter embodiment involves even less effort than the former embodiment, since rotation of a strand about its central axis can be accomplished by particularly low effort.

In an embodiment, the apparatus comprises an optical reflector configured for reflecting electromagnetic radiation from a surface portion of the composition to the detection probe. Such a reflector may be an optical reflector capable of reflecting electromagnetic radiation such as light which may be used in LCI technology. When such an optical reflector on the one hand and a detection probe on the other hand are arranged at different angular positions around a rotationally symmetric preform of the compositions (in particular an endless extrusion strand), the detection probe may also detect electromagnetic radiation from a back side of the composition (in relation to a position of the detection probe) due to electromagnetic radiation propagating from the backside to the reflector and being reflected at the reflector towards the detection probe. Thus, the described embodiment combines the advantage of a low effort (since a single detection probe may be sufficient) with the advantage that information about the material attribute (in particular layer thickness) may be determined around the entire circumference of the composition or preform thereof.

The composition may comprise a polymer. Particularly suitable polymers are pharmacologically acceptable polymers. These are physiologically tolerated polymers which are able to dissolve or swell in a physiological environment and to release an active ingredient (if present).

Exemplary ionic cellulosic polymers include, but are not limited to, carboxymethylcellulose (CMC) and its sodium salt, carboxyethylcellulose (CEC), hydroxyethylmethylcellulose acetate phthalate, hydroxyethylmethylcellulose acetate succinate, hydroxypropylmethylcellulose phthalate (HPMCP), hydroxypropylmethylcellulose succinate, hydroxypropylcellulose acetate phthalate (HPCAP), hydroxypropylcellulose acetate succinate (HPCAS), hydroxypropylmethylcellulose acetate phthalate (HPMCAP), hydroxypropylmethylcellulose acetate succinate (HPMCAS), hydroxypropylmethylcellulose acetate trimellitate (HPMCAT), hydroxypropylmethylcellulose acetate phthalate (HPMCAP), hydroxypropylcellulose butyrate phthalate, carboxymethylethylcellulose and its sodium salt, cellulose acetate phthalate (CAP), methylcellulose acetate phthalate, cellulose acetate trimellitate (CAT), cellulose acetate terephthalate, cellulose acetate isophthalate, cellulose propionate phthalate, cellulose propionate trimellitate, cellulose butyrate trimellitate and mixtures thereof.

Exemplary nonionic cellulosic polymers include, but are not limited to, methylcellulose (MC), ethyl cellulose (EC), hydroxyethyl cellulose (HEC), hydroxypropylcellulose (HPC), hydroxypropylmethylcellulose (HPMC), hydroxypropylmethylcellulose acetate, hydroxyethylmethylcellulose, hydroxyethylcellulose acetate, hydroxyethylethylcellulose and mixtures thereof.

Exemplary vinyl polymers and copolymers include, but are not limited to, methacrylic acid copolymers, aminoalkyl methacrylate copolymers, carboxylic acid functionalized polymethacrylates, and amine-functionalized polymethacrylates, poly(vinyl acetal) diethylaminoacetate, polyvinyl pyrrolidone (PVP), copovidone, polyvinyl alcohol (PVA), polyvinyl alcohol/polyvinyl acetate (PVA/PVAc) copolymers and mixtures thereof. Polyvinyl pyrrolidone (PVP) and polyvinyl alcohol/polyvinyl acetate (PVA/PVAc) copolymers are preferred.

Other polymers that can be used include, but are not limited to, polyethyleneoxide polyethylene glycol/polypropylene glycol (PEG/PPG) copolymers, polyethylene/polyvinyl alcohol (PE/PVA) copolymers, dextrin, pullulan, acacia, tragacanth, sodium alginate, propylene glycol alginate, agar powder, gelatin, starch, processed starch, glucomannan, chitosan and mixtures thereof, shellac, pectin, guar flour, starch and degraded starches, starch derivatives, dextrin, pullulan, acacia, tragacanth, sodium alginate, propylene glycol alginate, agar or phospholipids.

Moreover, the pharmaceutical composition may also comprise an active ingredient, in particular an active pharmaceutical ingredient (API).

If a glass-like matrix—in which an active ingredient is present as a so-called solid solution in molecular dispersive way—is investigated with the OCT method, the recrystallization can be monitored during cooling. This may allow to obtain an on-line method to investigate solid dispersions. A change in morphology may occur that can be monitored in the OCT procedure. In particular, this applies to glass-like solid dispersions. The analyzed preparation may be completely transparent. Thus, the OCT method may be used for polymer carrier-based molecularly dispersed drug preparations. Molecular-disperse distributions may be so-called solid solutions which may exist in a glass-like as well as not glass-like polymeric carrier system. In an embodiment of the invention, the OCT probe may be used for a quality control of a transparent matrix during the cooling process. Therefore, active ingredients may be those which may occur in such fixed solutions.

For the purposes of embodiments of the invention, active ingredients are all substances having a physiological action and minimal side effects provided they do not decompose under the processing conditions. In particular they are pharmaceutical active ingredients (for humans and animals), active ingredients for plant treatment, active ingredients for feed and foodstuffs, etc. The amount of active ingredient per dose unit and the concentration can each be varied within wide limits depending on efficacy and rate of release. The sole condition is that they are sufficient to attain the desired effect. Combinations of active ingredients can also be employed. For the purposes of embodiments of the invention active ingredients can also be vitamins and mineral substances (as may be present in feed and foodstuffs), and also plant treatment agents and insecticides. The vitamins include vitamins of the A group, the B group, meaning not only $B_1$, $B_2$, $B_6$, and $B_{12}$ and nicotinic acid and nicotinamide but also compounds having vitamin B properties, for example adenine, choline, pantothenic acid, biotin, adenylic acid, folic acid, orotic acid, panagamic acid, carnitine, p-aminobenzoic acid, myo-inositol and lipoic acid, and also vitamin C, vitamins of the D group, E group, F group, H group, I and J group, K group and P group. Active ingredients for the purposes of embodiments of the invention also include therapeutic peptides.

The process according to embodiments of the invention is suitable, for example, for processing the following active ingredients: acebutolol, acetylcysteine, acetylsalicylic acid, acyclovir, alprazolam, alfacalcidol, allantoin, allopurinol, ambroxol, amikacin, amiloride, aminoacetic acid, amiodarone, amitriptyline, amlodipine, amoxicillin, ampicillin, ascorbic acid, aspartame, astemizole, atenolol, beclomethasone, benserazide, benzalkonium hydrochloride, benzocaine, benzoic acid, betamethasone, bezafibrate, biotin, biperiden, bisoprolol, bromazepam, bromhexine, bromocriptine, budesonide, bufexamac, buflomedil, buspirone, caffeine, camphor, captopril, carbamazepine, carbidopa, carboplatin, cefaclor, cefalexin, cefadroxil, cefazolin, cefixime, cefotaxime, ceftazidime, ceftriaxone, cefuroxime, celegiline, chloramphenicol, chlorhexidine, chlorpheniramine, chlortalidone, choline, cyclosporin, cilastatin, cimetidine, ciprofloxacin, cisapride, cisplatin, clarithromycin, clavulance acid, clomipramine, clonazepam, clonidine, clotrimazole, codeine, cholestyramine, cromoglycic acid, cyanocobalamin, cyproterone, desogestrel, dexamethasone, dexpanthenol, dextromethorphan, dextropropoxiphene, diazepam, diclofenac, digoxin, dihydrocodeine, dihydroergotamine, dihydroergotoxin, diltiazem, diphenhydramine, dipyridamole, dipyrone, disopyramide, domperidone, dopamine, doxycycline, enalapril, ephedrine, epinephrine, ergocalciferol, ergotamine, erythromycin, estradiol, ethinylestradiol, etoposide, Eucalyptus globulus, famotidine, famvir, felodipine, fenofibrate, fenofibric acid, fenoterol, fentanyl, flavin mononucleotide, fluconazole, flunarizine, fluorouracil, fluoxetine, flurbiprofen, folinicx add, furosemide, gallopamil, gemfibrozil, gentamicin, Gingko biloba, glibenclamide, glipizide, clozapine, Glycyrrhiza glabra, griseofulvin, guaifenesin, haloperidol, heparin, hyaluronic add, hydrochlorothiazide, hydrocodone, hydrocortisone, hydromorphone, ipratropium hydroxide, ibuprofen, impinem, imipramine, indomethacin, iohexol, iopamidol, isosorbide dinitrate, isosorbide mononitrate, isotretinoin, ketotifen, ketoconazole, ketoprofen, ketrorolac, labetalol, lactulose, lecithin, levocarnitine, levodopa, levoglutamide, levonorgestrel, levothyroxine, lidocaine, lipase, lisinopril, loperamide, lopinavir, lorazepam, lovastatin, medroxyprogesterone, menthol, methotrexate, methyldopa, methylprednisolone, metoclopramide, metoprolol, miconazole, midazolam, minocycline, minoxidil, misoprostol, morphine, multivitamin mixtures or combinations and mineral salts, N-methylephedrine, naftidrofuryl, naproxen, neomycin, nicardipine, nicergoline, nicotinamide, nicotine, nicotinic acid, nifedipine, nimodipine, nitrazepam, nitrendipine, niza-tidine, norethisterone, norfloxacin, norgestrel, nortriptyline, nystatin, ofloxacin, omeprazole, ondansetron, pancreatin, panthenol, pantothenic acid, paracetamol, penicillin G, peni-cillin V, phenobarbital, phenoxifylline, phenoxymethypeni-cillin, phenylephrine, phenylpropanolamine, phenytoin, piroxicam, polymyxin B, povidone iodine, pravastatin, prazepam, prazosin, prednisolone, prednisone, propafenone, propranolol, proxyphylline, pseudoephedrine, pyridoxine, quinidine, ramipril, ranitidine, reserpine, retinal, riboflavin, rifampicin, ritonavir, rutoside, saccharin, salbutamol, salca-tonin, salicylic acid, simvastatin, somatotropin, sotalol, spironolactone, sucralfate, sulbactam, sulfamethoxazole, sulfasalazine, sulpiride, tamoxifen, tegafur, teprenone, tera-zosin, terbutaline, terfenadine, tetracycline, theophylline, thiamine, ticlopidine, timolol, tranexamic acid, tretinoin, triamcinolone acetonide, triamterene, trimethoprim, troxeru-tin, uracil, valproic acid, vancomycin, verapamil, vitamin E, zidovudine, zotepine.

The active ingredient is preferably employed in the form of a dispersion, emulsion or solution. Any ancillary sub-stances which may be used for carrying out these process is likewise a constituent of the active ingredient according to embodiments of the invention.

The aspects defined above and further aspects of the invention are apparent from the examples of embodiment to be described hereinafter and are explained with reference to these examples of embodiment.

DETAILED DESCRIPTION OF THE DRAWINGS

Figure 1:
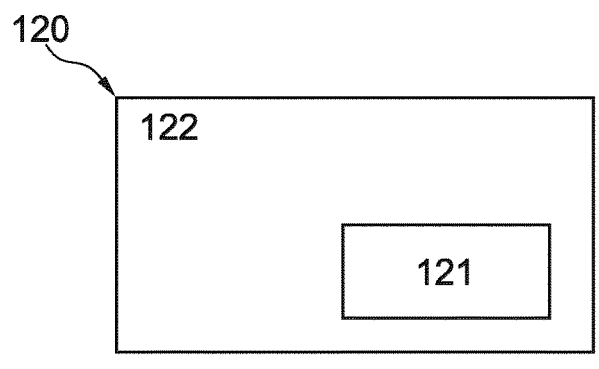
FIG. 1 illustrates a schematic view of a device for monitoring a property of a coating of a composition embod-ied as pharmaceutical dosage form according to an exem-plary embodiment.

The illustrations in the drawings are schematic. In differ-ent drawings, similar or identical elements are provided with the same reference signs.

Before, referring to the drawings, exemplary embodi-ments will be described in further detail, some basic con-siderations will be summarized based on which exemplary embodiments of the invention have been developed.

According to an exemplary embodiment of the invention, an LCI (and preferably OCT) based determination of a material attribute of a composition (for instance a pharma-ceutical composition, or a dosage form) may be carried out during a thermal manufacturing process. In particular, such a thermal manufacturing process may be a co-extrusion process by which a core may be provided with an active agent, for instance a pharmaceutically active agent. There-after, such a core may be coated with a coating, for instance by co-extrusion, for fine-tuning the release properties of the active agent. In another embodiment, a core may be a carrier and an active agent may be included in the coating applied onto said carrier. For instance, such a coating may be formed by co-extrusion or polymerization in a cooling bath. The exterior coating may then be monitored by OCT in a continuous and substantially real time way during the manu-facturing process or part thereof, in particular during the thermal manufacturing process. This may allow monitoring a thermal manufacturing process, its characteristics and/or its results without impact on the manufacturing process and the manufactured compositions and in a quick way substan-tially during the manufacture. Process control and process adaptation on the basis of the results of the determination of the material attribute may be made possible as well. At the same time, also the manufactured composition remains completely uninfluenced by the contactless and non-inva-sive monitoring method of LCI.

In particular, in-line OCT analysis of polymeric structures may be carried out simultaneously with a thermal manufac-turing process. More specifically, a sensing setup for moni-toring properties of the polymeric structure of an at least partially solid material or subcooled melts may be provided, wherein the monitoring apparatus may be configured for monitoring the properties of the polymeric structures simul-taneously with and during a thermal manufacturing process using low coherence interferometry. In such a sensing setup, the properties of the polymeric structures may be monitored in a non-destructive and time resolved manner. It may be in particular possible that the properties of the polymeric structures are monitored continually at different positions along the circumference. Preferably, the acquired data of the properties of the polymeric structures may be treated in an automatic manner by integrated image recognition algo-rithms. The sensing setup according to an exemplary embodiment of the invention may be configured for further providing information about the quality of the product based on real-time data of the monitored properties of the polymeric structure in relation to predefined criteria.

In the following, a possible concept of an in-line OCT setup according to an exemplary embodiment will be explained. In-line OCT may be implemented to monitor the properties of polymeric structures during a manufacturing process. In particular, there are two preferred options for the process interface:

(1) three detection probes may be located in a 120° arrangement to check the skin thickness and centering of the core, or (2) one detection probe may be provided which is actively rotating around the entire circumference of the (in particular stationary) co-extrudate (or vice versa), wherein the sample may optionally actively rotate with a static sensor.

A possible application of exemplary embodiments is in particular to implement in-line OCT for monitoring of a co-extrusion process. For example, it may be possible to monitor pharmaceutical compositions (such as core-skin strands). In other embodiments, it may be possible to monitor co-extruded packaging films for food, medical, pharmaceutical or agricultural products. It may also be possible to monitor a film extrusion process. Examples for corresponding pharmaceutical compositions are transdermal patches, implants, sublingual films, packaging material, etc. Other embodiments may enable to monitor an extrusion coating or a lamination process. Also functional chemical coatings may be investigated according to exemplary embodiments, such as plastics and foils. In yet another embodiment, it may be possible to monitor a 3D-printing or a 2D-printing process. In particular in terms of pharmaceutical compositions, also a functional printing of compositions may be monitored in-line.

In the following, further details concerning the monitoring of a co-extrusion process according to an exemplary embodiment will be explained. Co-extrusion may involve the simultaneous hot-melt extrusion of two or more materials through the same die, resulting in a multilayered extrudate. For instance, co-extruded compositions may be used in female health and contraception (for instance in form of intravaginal rings). Skin thickness of co-extruded strands may impact the drug diffusion rate. According to an exemplary embodiment, it may be possible to measure the skin thickness (and/or its variation) and/or the structure of the extrudate (for example homogeneity, roughness) during manufacturing and for process development (optimized settings for uniform skin), rather than only determining the overall strand diameter. This may be highly advantageous for quality control (for instance to determine whether a skin property is or is not within a specification).

In particular, it may be possible to monitor a film extrusion process. Film extrusion is a production method which may be used for instance in the packaging sector. A film may be produced by blowing air into a thin extruded plastic bubble which may then be converted with rollers into a film. Such films may be thin layers containing one or more polymers, with or without plasticizer. They can be taken as a composition or be applied directly as a wound dressing with therapeutic healing effect. Laminates may comprise or consist of multiple layers of films or small plates. OCT may be used to measure the single or multiple layers during manufacturing for instance for process development and quality control.

In yet another embodiment, it may be possible to monitor an extrusion coating or lamination process. Plastic extrusion may denote a process that enables to produce a melt of thermoplastic polymer material. When this poly melt is coated as a thin layer onto a moving substrate as a functional coating, the process may be denoted as "extrusion coating". When the polymer melt in the above mentioned process is used as a glue to combine two substrates, it may be denoted as "extrusion lamination".

In still another embodiment, OCT may be used to measure the coating thickness uniformity and the film adhesion to the substrate during manufacturing for instance for process development and quality control.

According to still another exemplary embodiment, it may be possible to monitor a 3D-printing process. Three dimensional printed compositions may allow definition of specific shapes, for instance of tablets. Due to the control of the internal and external shape, the porosity and available surface area can be tailored. This may support controlled release of active pharmaceutical ingredients (API) or extremely fast release rates. Advantageously, OCT may be implemented to measure the structure of a 3D-printed solid composition during manufacturing for instance for process development and quality control.

For example, Fused Deposition Modeling (FDM) may be applied to thermoplastic materials in layers through a melt layer process. For instance, intravaginal rings may be manufactured correspondingly (or by injection molding or co-extrusion). Such intravaginal rings may be configured as reservoir-type systems having a core which contains drugs and being embedded in a polymer. A membrane may regulate drug release via drug diffusivity in the skin, which may be determined or defined by membrane material. Membrane thickness may be defined, in turn, by co-extrusion process parameters. Conventionally, membrane thickness may be measured off-line at a few positions. As a result, a whole batch may fail in meeting in-vitro dissolution criteria. An in-line measurement technique according to an exemplary embodiment of the invention may allow for constant thickness monitoring and correction, which may result in a continuous processing. This may allow to save time and effort.

Furthermore, OCT investigations on co-extruded strands may be possible according to exemplary embodiments. In this context, it may be possible to rotate a strand, for instance with a stepper motor. By taking this measure, skin thickness can be precisely determined. More specifically, OCT may reveal the inner structure of the co-extruded strand. Advantageously, variations in skin thickness can be observed as well as potential non-centricity. Furthermore, the skin of the sample may contain trace amounts of pigments (such as $Fe_2O_3$) for better contrast. Apart from this, improvements in visualization may be possible. OCT may be possible to visualize defects in the co-extrudate due to for instance faulty extrusion tools. Advantageously, a calibration-free measurement system may be provided according to exemplary embodiments. Furthermore, layer thickness can be determined directly from OCT images. For a proper evaluation of the data, it may be advantageous if the refractive index is known. Further advantageously, no chemormetric calibration models are required for quantification (in contrast to Raman spectroscopy, NIR (near infrared) spectroscopy, etc.).

When carrying out in-line process monitoring, OCT can lead to a fast and precise execution of the co-extrusion process. A very small sensor may be advantageously sufficient for pharmaceutical industry, which may for instance be applied to monitor pan coating processes.

A further advantage of exemplary embodiments may be that OCT is a non-destructive and contactless system for lab and in-line applications in a production environment. OCT acquires cross-sectional images to reveal the internal structure of semi-transparent and turbid materials, for instance coextruded strands.

In the following, referring to FIG. 1, an apparatus 120 for monitoring a property of a coating 124 of a pharmaceutical solid dosage form as an example for a composition 100 (see FIG. 2) during a manufacturing process of forming the solid composition 100 by a thermal manufacturing process according to an exemplary embodiment will be explained.

The apparatus 120 for monitoring a property of a coating 124 of a solid composition 100 during a thermal manufacturing process comprises a manufacturing device 122 configured for manufacturing the solid composition 100 using at least one thermal manufacturing process. The manufacturing device 122 may treat a precursor or a preform of the composition 100 to be manufactured during the manufacturing process in such a way that it is temporarily heated, in particular to a temperature of at least 50° C. or at least 100° C., during carrying out the one or more thermal manufacturing processes. Furthermore, the apparatus 120 comprises a monitoring device 121 configured for monitoring the property of the coating 124 of the solid composition 100 in process, i.e. during carrying out the at least one thermal manufacturing process. In particular, the monitoring device 121 is placed in such a way in the embodiment of FIG. 1 that at least a part of the monitoring device 121 is located in the manufacturing device 122. For example, the manufacturing device 122 may comprise a co-extruder in which the solid composition 100 may be manufactured by a thermal manufacturing process. The monitoring device 121 may be placed in a hole or a recess formed in a mantle of the container of the manufacturing device 122. The monitoring device 121 is configured performing a low coherence interferometry measurement in order to monitor the property of the coating 124 of the solid composition 100 during the co-extrusion process using low coherence interferometry.

In the following, referring to FIG. 2, an apparatus 120 for a low coherence interferometry measurement and evaluation according to an exemplary embodiment will be explained. The apparatus 120 comprises a detection probe 106 and a processor 104, and a manufacturing device 122 as the one shown in FIG. 1 or the one shown in FIG. 3. For instance, the detection probe 106 and the processor 104 may together form a monitoring device 121, as described referring to FIG. 1.

The detection probe 106 comprises, in turn, a light source 230 having a high spatial coherence and a low temporal coherence. The light obtained from the light source 230 may be coupled into an optical fiber 232. Alternatively, the light from the light 230 may be guided freely, this means that the optical fiber 232 may be omitted. The light is guided towards a directional element 234.

The directional element 234 is configured in such a way that at least a part of the light travelling backwards, that is the light, which is reflected back towards the light source 230, is separated from the light originating from the light source 230. Thus, the back reflected light will not be directed towards the light source 230. Instead, the back reflected light may be directed into analyzing unit or processor 104. There may be several possible setups as how to implement directional element 234. For example, the directional element 234 may be based on a beam splitter, a polarizing beam splitter and a wave plate, a Faraday rotator and/or an optical isolator. Depending on the directional element 234, it may happen that light is coupled back into the light source 230. Depending on the light source 230, suitable protection measures may have to be taken. For example, the light source 230 may be protected from retro-reflected light by an optical isolator.

After passing the directional element 234, the light is directed towards an interferometer 240. In particular, the light may be shaped by a beam shaping element, such as a lens and/or a telescope, in order to provide a collimated light beam, a focused light beam or a divergent light beam. The employed interferometer 240 obtains information about a property of a coating 124 formed on a core 102 of a solid composition 100 by interfering light scattered from the solid composition 100 with a reference beam. Depending on the employed interferometer 240, the light beam carrying the interference signal may be superimposed with the light coming from the light source 230. In order to analyze the interference signal and extract the obtained information, the two beams, that is the incoming light beam and the light beam carrying the interference signal, are separated from one another by the directional element 234, for example by a beam splitter. Further, depending on a specific implementation of the directional element 234, there may be a risk that a part of the reflected light reaches the light source 230. This may cause problems with the light source 230 depending on the light source 230. This may be prevented by an optical isolator or optical diode through which light may only travel in one direction. The separated light beam carrying the interference signal is then guided towards analyzing unit or processor 104 which analyzes the interference signal and extracts the information, particularly depth information, about the monitored property of the coating 124.

Figure 2:
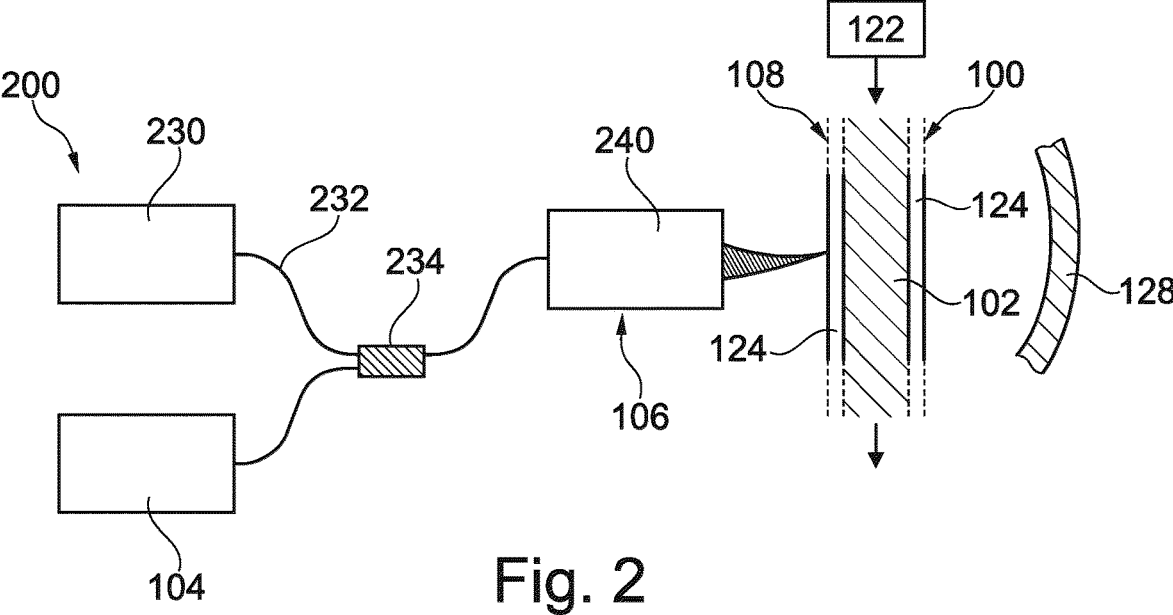
FIG. 2 shows a schematic setup of a low coherence interferometry measurement.

As shown, the embodiment of FIG. 2 comprises a detection probe 106 for detecting information from one side of the solid composition 100. Apart from this, a reflector 128 is provided which is configured for reflecting electromagnetic radiation originating from a surface portion of the composition 100 back to the detection probe 106. Thus, also information from hidden or shaded surface portions of the solid composition 100 may be monitored using a single detection probe 106.

As indicated in FIG. 2 with arrows, a continuous endless strand 108 of co-extruded material forming the composition 100 is provided from the co-extrader-type manufacturing device 122 and is thereby brought in a field of view of the OCT probe 106. Thereby, a continuous in-line measurement of the compositions 100 composed of core 102 and coating 124 may be carried out by OCT.

For example, the endless strand 108 may be separated (for instance cut) into separate pieces, Each piece may represent a manufactured composition 100. For instance, such a piece may be brought in an annular shape and may then function as an intravaginal ring for contraception.

Figure 3:
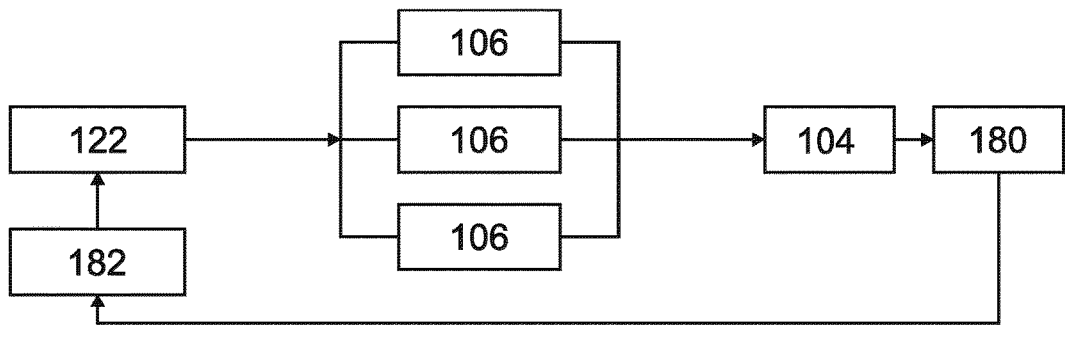
FIG. 3 illustrates an apparatus for manufacturing an at least partially solid composition and for determining infor-mation indicative of a material attribute of the manufactured composition embodied as pharmaceutical dosage form according to an exemplary embodiment.

FIG. 3 illustrates an apparatus 120 for manufacturing an at least partially solid composition 100 (for instance the one shown in FIG. 2) and for determining information indicative of a material attribute of the manufactured composition 100 according to an exemplary embodiment.

As shown, the apparatus 120 comprises a manufacturing device 122 configured for manufacturing the composition 100 using a thermal manufacturing process, for instance co-extrusion.

Figures 4, 5, 6, 7:
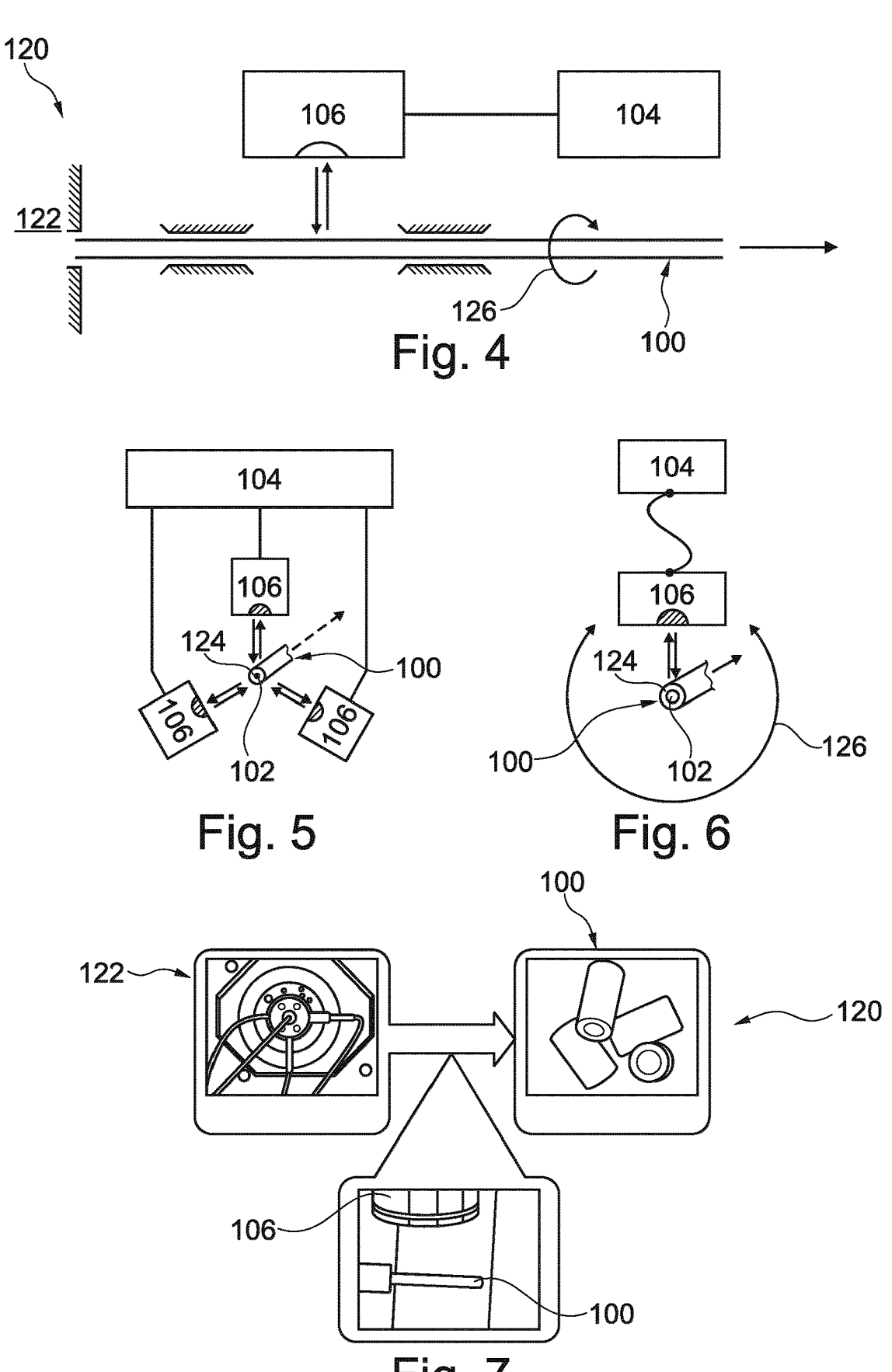
FIG. 4 illustrates an apparatus for manufacturing an at least partially solid pharmaceutical composition and for determining information indicative of a material attribute of the manufactured composition using a rotating strand according to another exemplary embodiment.
FIG. 5 illustrates an apparatus for manufacturing an at least partially solid composition and for determining infor-mation indicative of a material attribute of the manufactured composition using a plurality of circumferentially distrib-uted probes according to still another exemplary embodi-ment.
FIG. 6 illustrates an apparatus for manufacturing an at least partially solid composition and for determining infor-mation indicative of a material attribute of the manufactured composition using a rotating probe according to yet another exemplary embodiment.
FIG. 7 schematically illustrates constituents of an appa-ratus for manufacturing an at least partially solid composi-tion and for determining information indicative of a material attribute of the manufactured composition according to an exemplary embodiment.

Moreover, apparatus 120 comprises a plurality of detection probes 106 each configured for detecting detection data from the composition 100 during manufacture by said thermal manufacturing process. The above-mentioned detection probes 106 may be arranged at different angular positions around a circumference of the manufactured composition 100 (for instance in the way as shown in FIG. 5). In the shown embodiment, all three detection probes 106 may be spatially stationary, so that each detection probe 106 detects data corresponding to a certain circumferential angular range of the composition 100. This detection may be accomplished by low coherence interferometry (LCI), preferably optical coherence tomography (OCT).

Furthermore, a processor 104 is provided which is configured for determining the material attribute information of the compositions 100 based on the detected detection data. For instance, a thickness distribution of coating 124 around a perimeter of the composition 100 may be determined by the processor 104. This information may be supplied to a quality control unit 180. The quality control unit 180 may evaluate the material attribute information provided by the processor 104 by applying one or more quality criteria. For instance, it may be determined whether an average thickness of the coating 124 is within a range allowed by a specification. Additionally or alternatively, it may be determined by the quality control unit 180 whether a deviation of the thickness of the coating 124 along the circumference is in accordance with a specification.

After processor 104 determines material attribute information concerning the compositions 100 and the quality control unit 180 determines a quality of the manufactured compositions 100, the output of the quality control unit 180 may be communicated to a process control unit 182. When the material attribute information determined by the processor 104 and evaluated by the quality control unit 180 indicates that the compositions 100 have—or part thereof has—properties which do not comply with a specification for the manufacture of the compositions 100, the process control unit 182 may control the manufacturing device 122 to take a corresponding action concerning the manufacturing process, for instance to change process parameters. For example, the coating process may be adjusted, an alarm may be generated and/or the manufacturing process may be interrupted or terminated when a discrepancy is detected.

With the shown apparatus 120, information indicative of a material attribute of the at least partially solid composition 100 may be determined. For this purpose, it may be possible to manufacture the composition 100 using a thermal manufacturing process (which may involve a phase change of the composition 100 from liquid to solid during the thermal manufacturing process). For instance, the manufacture may be carried out by extrusion (in particular co-extrusion) or molding (in particular injection molding). During said manufacturing process, it may be possible to detect detection data from the composition 100 by low coherence interferometry. Furthermore, it may be possible to determine the information based on the detected detection data, preferably during the thermal manufacturing process.

For example, the method may comprise manufacturing the composition 100 by coating a core 102 with one or more layer of coatings 124. More specifically, it may be possible to manufacture the composition 100 by extruding core 102 and coating the core 102. Said coating process for coating the core 102 may be a further extrusion process or may be accomplished by immersing core 102 in a cooling bath (not shown).

The composition 100 may be brought in a field of view of a respective one of the detection probes 106 for detecting the detection data during manufacturing the composition 100. In particular, it may be possible to determine the information indicative of the material attribute of a polymeric structure of the composition 100 without destruction of the composition 100. Advantageously, the information indicative of the material attribute of the compositions 100 being continuously manufactured during the detecting may be monitored continuously as well. In view of the multiple detection probes 106 arranged around the circumference of the composition 100, it may be possible to determine the information indicative of the material attribute of the composition 100 along an entire circumference of the composition 100. For instance, an endless strand 108 constituting the composition 100 may be monitored around an entire circumference thereof. For example, determining the information may be performed using automated image recognition.

FIG. 4 illustrates an apparatus 120 for monitoring an at least partially solid composition 100 and for determining information indicative of a material attribute of the manufactured composition 100 according to another exemplary embodiment.

As indicated in FIG. 4, the illustrated apparatus 120 may comprise a motion mechanism 126 configured for moving the detection probe 106 and the manufactured composition 100 relative to each other. As indicated, the motion mechanism 126 may be configured for rotating the composition 100 about its central axis while the detection probe 106 is stationary. Thus, FIG. 4 shows an embodiment, in which a co-extruded strand as a preform of compositions 100 rotates during the manufacturing process so that a single detection probe 106 may be sufficient for monitoring the composition 100 around a circumference thereof. For instance, this may be accomplished for determining information concerning the thickness distribution of a coating of the strand around the entire perimeter.

Alternatively, the motion mechanism 126 may be configured for rotating the detection probe 106 while the composition 100 does not rotate.

FIG. 5 illustrates an apparatus 120 for manufacturing an at least partially solid composition 100 and for determining information indicative of a material attribute of the manufactured composition 100 according to still another exemplary embodiment.

The embodiment of FIG. 5 differs from the embodiment of FIG. 4 in that not only a single, but three stationary detection probes 106 are implemented according to FIG. 5 in order to avoid moving parts. The detection probes 106 are angularly distributed around a perimeter of a composition 100 extending perpendicular to the paper plane of FIG. 5. As shown, the composition 100 is composed of a central core 102 and a coating 124 on said core 102. The embodiment of FIG. 5 reduces the effort of operating the apparatus 120 and reduces artifacts on the measurement.

FIG. 6 illustrates an apparatus 120 for manufacturing an at least partially solid composition 100 and for determining information indicative of a material attribute of the manufactured composition 100 according to yet another exemplary embodiment.

In contrast to FIG. 5, FIG. 6 shows an embodiment in which a single detection probe 106 rotates around a rotationally symmetric and stationary composition 106 or a preform thereof, which may be a co-extrudate configured as in FIG. 5.

FIG. 7 schematically illustrates constituents of an apparatus 120 for manufacturing an at least partially solid composition 100 and for determining information indicative of a material attribute of the manufactured composition 100 according to an exemplary embodiment.

More specifically, FIG. 7 shows the interaction between a thermal manufacturing process carried out by manufacturing device 122 (in particular a co-extrusion process) for manufacturing solid compositions 100 and a noninvasive contact-free analysis of the physical properties or material attributes of the manufactured compositions 100 by OCT. A corresponding OCT-measurement is indicated by a corresponding probe 106 in FIG. 7.

Figure 8:
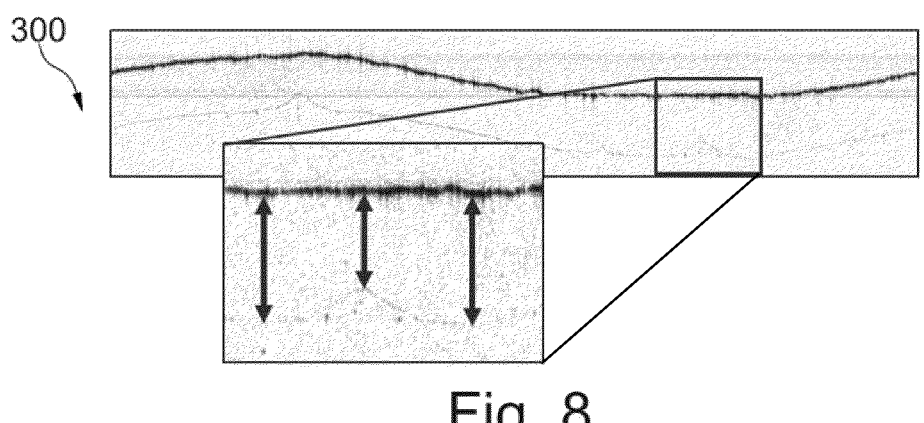
FIG. 8 illustrates an image showing information obtained by carrying out a method according to an exemplary embodiment.

FIG. 8 illustrates an image 300 showing information obtained by carrying out a method according to an exemplary embodiment. More specifically, FIG. 8 illustrates an OCT cross-sectional image of the full skin circumference of a co-extruded strand. This image may be captured by in-line OCT for polymeric structures. The measurement results of FIG. 8 show that by exemplary embodiments of the invention a thickness and thickness distribution around a perimeter of an endless strand 108 as a preform of solid compositions 100 may be determined accurately.

Figure 9:
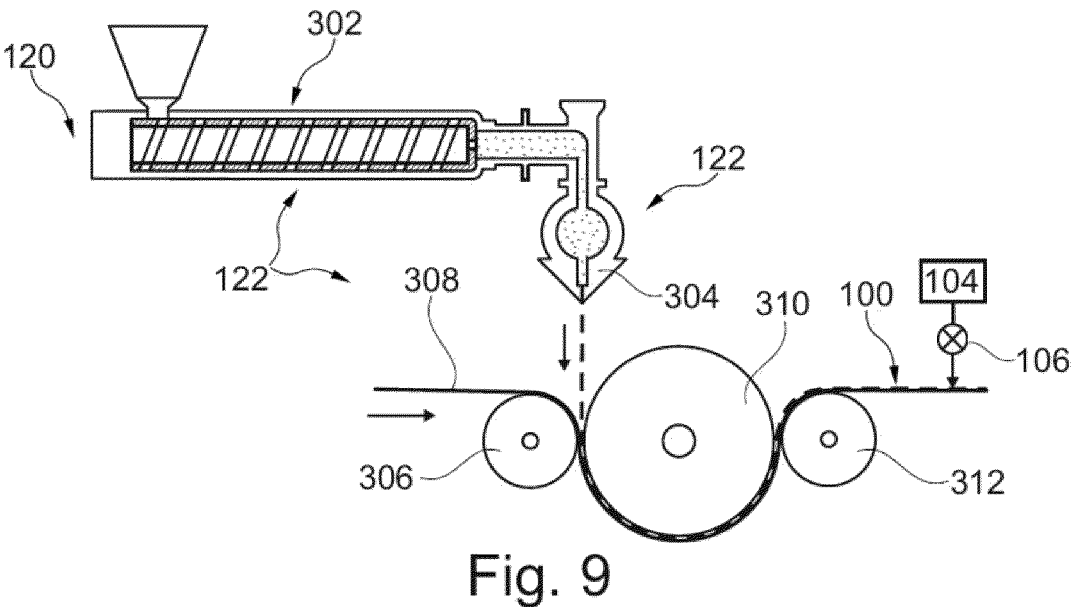
FIG. 9 and FIG. 10 illustrate apparatuses for manufactur-ing an at least partially solid composition by extrusion and for determining information indicative of a material attribute of the manufactured composition according to other exem-plary embodiments.
Figure 10:
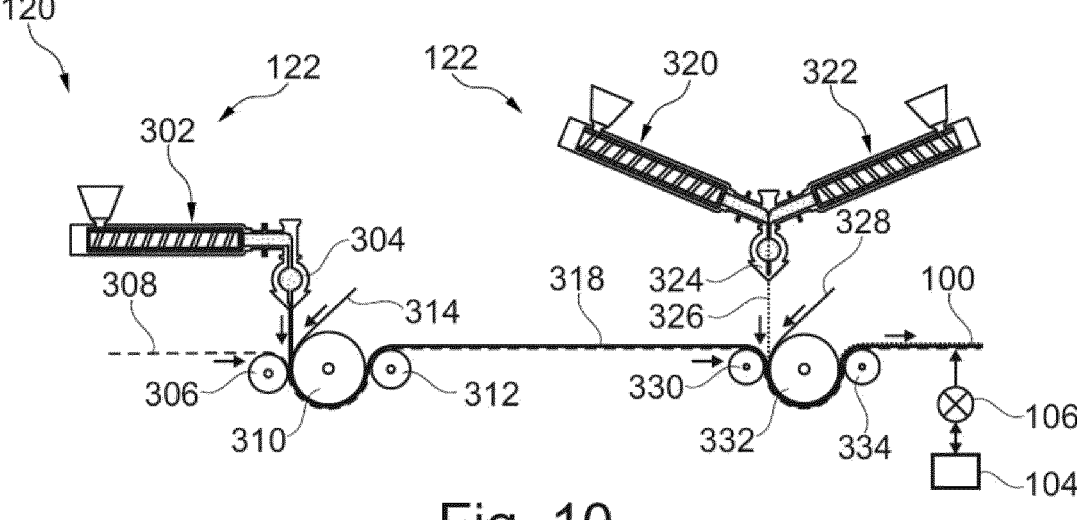

FIG. 9 and FIG. 10 illustrate apparatuses 120 comprising manufacturing devices 122 for manufacturing an at least partially solid composition 100 and for determining information indicative of a material attribute of the manufactured compositions 100 according to other exemplary embodiments.

FIG. 9 shows an extrusion device 302 used for extruding a foil or strip as preform of solid compositions 100 by an extrusion die 304. At a first roll 306 cooperating with a second roll 310, the so formed extruded foil or strip may be connected with a layer 308 made of another material by lamination, i.e. the application of heat and/or pressure. Rolls 306, 310 ensure a proper connection between the foil or strip and layer 308. This connection may be further enhanced by a third roll 312 cooperating with the second roll 310. As shown as well, in-line in this manufacturing process, an OCT detection probe 106 can be used for determining a material property of the obtained solid compositions 100 or preforms thereof, in cooperation with a corresponding processor 104. By the apparatus 120 shown in FIG. 9, an extrusion coated substrate may be formed, for instance as an oral dispersible film (ODF).

In the embodiment of FIG. 10, many of the elements illustrated in FIG. 9 are shown again. Additionally, a second layer 314 is connected with the first layer 308 and the foil or strip by the rolls 306, 310 and 312. As a result, a three-component layer structure or intermediate laminate 318 is obtained. Thereafter, a second extrusion device 320 and a third extrusion device 322 produce together a second constituent 326 of the compositions 100 at a further extrusion die 324 at which the second extrusion device 320 and the third extrusion device 322 are connected. The second constituent 326 is then connected between the intermediate laminate 318 and a third layer 328 by further rolls 330, 332, 334 to thereby create composition 100. An in-line OCT detection probe 106 can be used for determining a material property of the obtained solid compositions 100 or preforms thereof, in cooperation with a corresponding processor 104.

Figure 11:
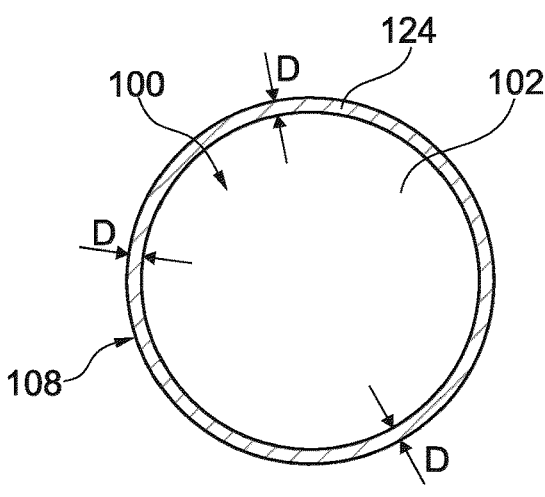
FIG. 11 and FIG. 12 illustrate cross-sectional views of multilayer strands analyzed by methods according to an exemplary embodiment.
Figure 12:
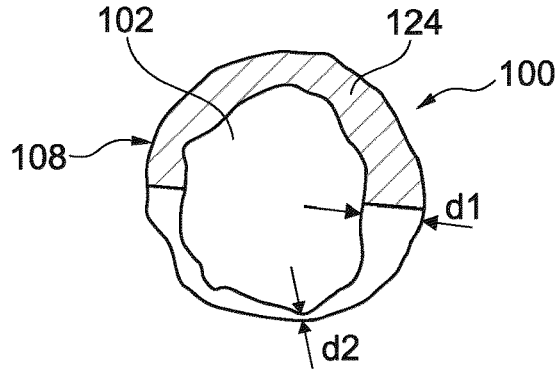

FIG. 11 and FIG. 12 illustrate cross-sectional views of strands 108 (formed by a core 102 with a skin or coating 124) extending in a direction perpendicular to the paper plane of FIG. 11 and FIG. 12 and being analyzed by methods according to an exemplary embodiment.

FIG. 11 shows a scenario in which a composition 100 composed of a core 102 and a coating 124 thereon has a homogenous coating thickness D along an entire perimeter and may therefore be considered as passing a quality test.

FIG. 12 shows another scenario, in which a pronounced inhomogeneity of the thickness distribution of the coating 124 has been detected by OCT, so that the solid composition 100 shown in FIG. 12 can be rejected, or another measure can be taken as a consequence of a failed quality test. For instance, this measure may be that the manufacturing process should be adapted or modified in order to meet predefined specifications of subsequently produced compositions 100. According to FIG. 12, the thickness of the coating 124 varies over a broad range from a largest thickness d1 to a smallest thickness d2. For instance, the composition 100 according to FIG. 11 and FIG. 12 may relate to a reservoir-type intravaginal ring. Core 102 may be a drug-loaded core, whereas coating 124 may be a drug-free skin.

Figure 13:
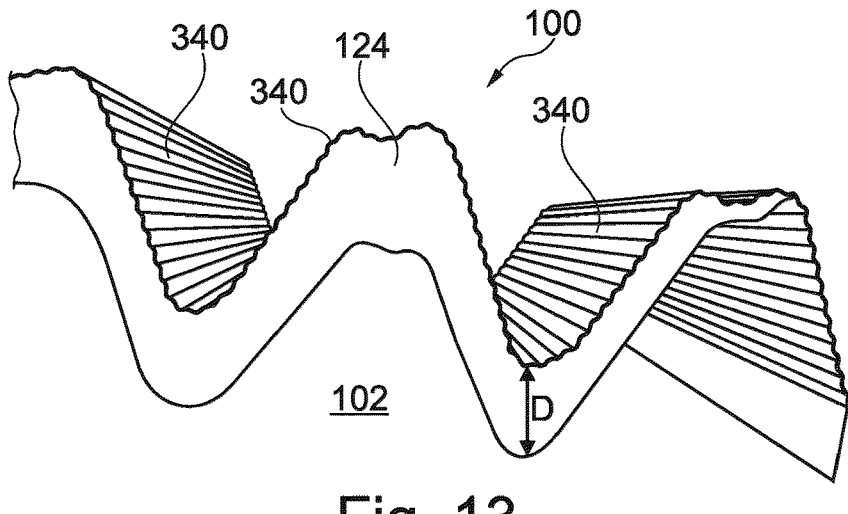
FIG. 13 illustrates an image obtained by carrying out a method according to an exemplary embodiment and includ-ing information concerning a coating of a solid composition.

FIG. 13 illustrates an image a composition 100 obtained by carrying out a method according to an exemplary embodiment and including information concerning a coating 124 of the solid composition 100.

FIG. 13 shows a three-dimensional view of raw data allowing to determine different material attributes of coating 124 of solid composition 100. The shown image illustrates a wave-shaped pattern, which is an artifact from a rotation during detection, as described above. Due to a slightly varying distance of the detection probe 106 with respect to the rotating composition 100, the artificial waves may be obtained. However, this phenomenon is not disturbing, since the artificial wave pattern can be removed by computation. The image of FIG. 13 shows that a determination of a thickness (D) distribution of the coating 124 as well as a determination of a roughness 340 of the exterior surface of the coating 124 is nevertheless possible with high precision.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. A method of determining information indicative of a material attribute of a composition, wherein the method comprises:

manufacturing the composition using a thermal manufacturing process;

wherein said manufacturing the composition comprises manufacturing the composition by extruding a core and coating the core, and further comprises coating the core by one of the group consisting of carrying out a further extrusion, and immersing in a coating bath;

wherein the composition is a pharmaceutical composition and/or wherein the composition is configured as an intravaginal ring for contraception;

wherein the method comprises continuously detecting detection data and continuously determining the information of an endless strand constituting the composition and being formed continuously by the thermal manufacturing process;

detecting detection data from the composition by low coherence interferometry during the thermal manufacturing process;

determining the information based on the detected detection data, wherein the information are indicative of at least one material attribute of a group consisting of a roughness of an exterior surface of the composition, a roughness between a core and a coating of the composition, a refraction index of at least part of the composition, information concerning an inclusion of the composition, and information concerning a porosity of the composition;

determining the information indicative of a material attribute of the composition during the thermal manufacturing process in real time;

wherein determining the information indicative of a material attribute of the composition comprises indicating anomalies or deviations from a predefined specification; and adapting the thermal manufacturing process in real time to continue the production of compositions in compliance with the predefined specification while the composition is produced by thermal manufacturing.

2. The method according to claim 1, wherein the thermal manufacturing process involves a phase transition of material of the composition, wherein the phase transition is between a solid phase and a liquid phase or viscous phase.

3. The method according to claim 1, wherein the method comprises manufacturing the composition by a thermal manufacturing process which comprises at least one of the group consisting of extrusion, co-extrusion, molding, or injection molding.

4. The method according to claim 1, wherein the method comprises manufacturing the composition by forming a plurality of coating layers on the core.

5. The method according to claim 1, wherein the method comprises bringing the composition in a field of view of a detection probe detecting the detection data during said thermal manufacturing process.

6. The method according to claim 1, wherein said coating the core by immersing in a coating bath comprises immersing in a cooling bath.

7. The method according to claim 1, wherein the method comprises determining information indicative of a material attribute of a polymeric structure of the composition.

8. The method according to claim 1, wherein the method comprises determining information indicative of a material attribute of the composition without destruction of the composition.

9. The method according to claim 1, wherein the method comprises continuously determining information indicative of a material attribute of compositions being continuously manufactured during the detecting.

10. The method according to claim 1, wherein the method comprises determining information indicative of a material attribute of the composition around more than half of a circumference of the composition, or along an entire circumference of the composition.

11. The method according to claim 1, comprising at least one of the following features:

wherein the method comprises determining the information by carrying out image recognition;

wherein the method comprises determining information indicative of a quality of the composition based on the determined information indicative of the material attribute of the composition;

wherein the method comprises manufacturing a composition which is configured as an intravaginal ring for contraception;

wherein the pharmaceutical composition is in a pharmaceutical dosage form;

wherein the method comprises detecting the detection data by optical coherence tomography; and wherein the method comprises determining the information for at least one composition of the group consisting of pellets, tablets, strands, films, patches, film foils, rings, a core with a coating, a core with a plurality of coating layers, a core without coating, and a carrier in form of a preferably transparent polymer in which a molecularly dispersed drug preparation is embedded.

12. An apparatus for manufacturing a composition and for determining information indicative of a material attribute of the manufactured composition, wherein the apparatus comprises:

a manufacturing device configured for manufacturing the composition using a thermal manufacturing process;

wherein the manufacturing device comprises means for manufacturing the composition by extruding a core and coating the core, and further comprises means for coating the core by one of the group consisting of carrying out a further extrusion, and immersing in a coating bath;

wherein the manufacturing device comprises means for continuously detecting detection data and continuously determining the information of an endless strand constituting the composition and being formed continuously by the thermal manufacturing process;

a detection probe configured for detecting detection data from the composition during said thermal manufacturing process, by low coherence interferometry; and a processor configured for determining the information based on the detected detection data, wherein the information are indicative of at least one material attribute of a group consisting of a roughness of an exterior surface of the composition, a roughness between a core and a coating of the composition, a refraction index of at least part of the composition, information concerning an inclusion of the composition, and information concerning a porosity of the composition;

determining the information indicative of a material attribute of the composition during the thermal manufacturing process in real time;

wherein determining the information indicative of a material attribute of the composition comprises indicating anomalies or deviations from a predefined specification; and adapting the thermal manufacturing process in real time to continue the production of compositions in compliance with the predefined specification while the composition is produced by thermal manufacturing.

13. The apparatus according to claim 12, wherein the apparatus comprises at least one further detection probe, wherein the detection probes are arranged at different angular positions around a circumference of the manufactured composition.

14. The apparatus according to claim 13, wherein the detection probe and the at least one further detection probe are stationary.

15. The apparatus according to claim 12, comprising a motion mechanism configured for moving the detection probe and the manufactured composition relative to each other.

16. The apparatus according to claim 15, comprising one of the following features:

the motion mechanism is configured for rotating the composition while the detection probe is stationary;

the motion mechanism is configured for rotating the detection probe while the composition is stationary.

17. The apparatus according to claim 12, wherein the apparatus comprises a reflector configured for reflecting electromagnetic radiation from a surface portion of the composition to the detection probe.

18. A method of determining information indicative of a material attribute of a composition, wherein the method comprises:

manufacturing the composition using a thermal manufacturing process;

wherein said manufacturing the composition comprises manufacturing the composition by extruding a core and coating the core, and further comprises coating the core by one of the group consisting of carrying out a further extrusion, and immersing in a coating bath;

wherein the composition is a pharmaceutical composition and/or wherein the composition is configured as an intravaginal ring for contraception;

wherein the method comprises continuously detecting detection data and continuously determining the information of an endless strand constituting the composition and being formed continuously by the thermal manufacturing process;

detecting detection data from the composition by low coherence interferometry during the thermal manufacturing process; and determining the information based on the detected detection data;

determining the information indicative of a material attribute of the composition during the thermal manufacturing process in real time;

wherein determining the information indicative of a material attribute of the composition comprises indicating anomalies or deviations from a predefined specification; and adapting the thermal manufacturing process in real time to continue the production of compositions in compliance with the predefined specification while the composition is produced by thermal manufacturing.

* * * * *